Nov. 19, 1929.  J. DE VEGA  1,736,036
COUPLING SYSTEM
Filed July 12, 1928
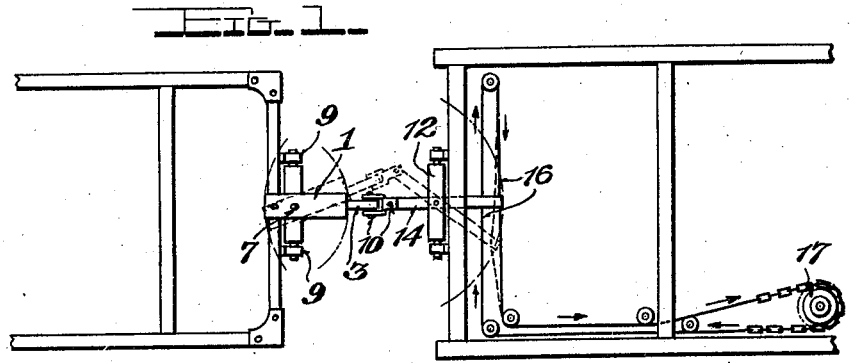
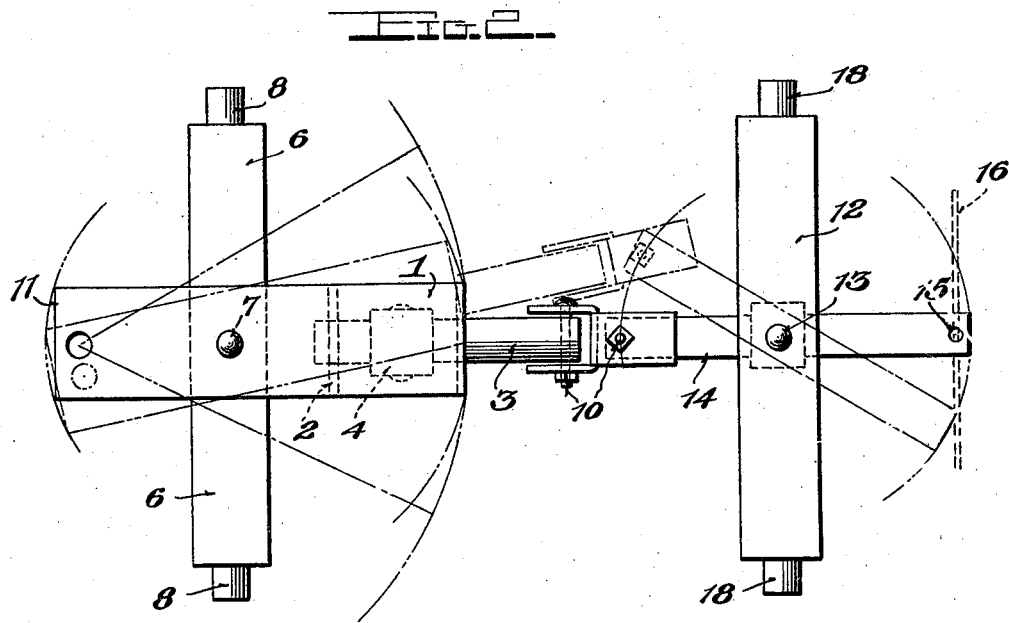
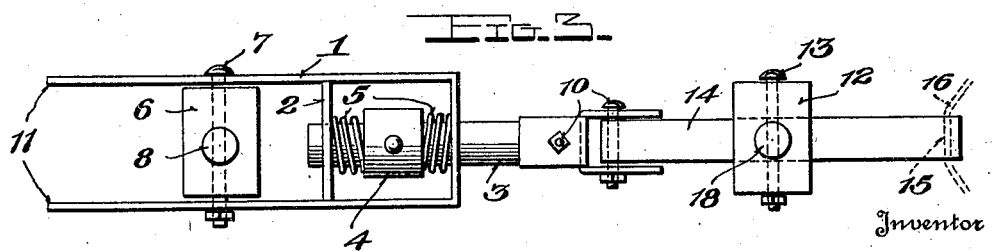
Inventor
Jesus de Vega,
By Emil Bönnelycke
Attorney Patented Nov. 19, 1929

1,736,036

UNITED STATES PATENT OFFICE

JESÚS DE VEGA, OF OLAVARRIA, ARGENTINA

COUPLING SYSTEM

Application filed July 12, 1928. Serial No. 292,055.

The present invention relates to a novel coupling system for automotive vehicles, trucks, tramways, wagons, and the like, and has essentially for its object to provide a coupling permitting free movements, either in the vertical or horizontal direction, or biasing thereof, relative to one vehicle coupled to another vehicle and permitting simultaneously the coupled vehicle to be directed from the motor, or vice-versa.

The invention also has in view other objects which will appear hereinafter and which are clearly defined in the appended claims forming part of the present specification.

In order that the present invention may be clearly understood and readily carried into practice the same has been represented, by way of example, on the accompanying drawings, in which:

Figure 1 is a diagrammatic plan view of one form of coupling between two vehicles according to the present invention.

Fig. 2 is a plan view of the coupling device according to the invention on an enlarged scale, and Fig. 3 is a side elevation of the device.

In all the figures similar or corresponding parts are designated by like reference characters.

The device according to the present invention comprises a plate 1 bent to assume a U shaped link provided with a bridge 2, which plate and bridge plate are perforated in order to permit the insertion of a shaft 3 maintained in place between the plate and the bridge by means of a collar 4 adjusted by means of an adjusting screw, or by a pin, and having a spring 5 at either side of the collar, as shown, thus permitting play of the said shaft in a longitudinal direction and through its bearings. The member 1 may be coupled directly to the end of the beam usually provided on a trailer, or the coupling may be effected by means of a balance beam 6 pivoted at 7 to the member 1 and the circular ends 8 of which fit into bearings 9 of the trailer car, as shown in Fig. 1. In the case of serial couplings, that is, several vehicles coupled one to the other, the coupling may be effected by means of two symmetrical devices as that described, connected together by a universal joint device 10, the direction being effected through the ends 11 of the members 1 which permit of the device adopting the angular positions indicated by dotted lines in Fig. 2.

The coupling may also be effected by means of a balance beam 12 on which is pivoted, at 13, a rod 14 one end of which is linked to the member 10, while its other end 15 is connected in any approved manner, for instance, by means of the cables 16, to a governing device 17 actuated in any convenient manner, either by hand, or through the medium of the governing device on the motor car.

The balance beam 12 is provided with stub-shafts 18 which fit into adequate bearings provided on the trailer.

As may be seen from the foregoing the present invention provides a means whereby all the vehicles coupled by means of the device hereinbefore described may effect oscillating movements in all directions, one independently of the other, and which may be governed one from the other, either either through the rod 14 or through the members 1 per se.

This arrangement offers particularly advantageous results in the cases when the vehicles are to be moved in a backward direction, as well as when turning movements in narrow angles are to be made, or when heavy traffic conditions are prevailing.

Obviously, there may be made different modifications as regards the construction and details without departing from the spirit of the present invention which is clearly defined in the appended claims.

Having thus fully described and ascertained the nature of my said invention and the manner in which the same is to be performed and carried into practice, what I claim as of my exclusive invention and proprietorship is:—

1. A coupling device for vehicles comprising a U-shaped link for one of the vehicles; a rod for the other vehicle; a balance beam rotatably secured to one of the vehicles by means of its ends and to which the link is pivotally mounted intermediate its ends; a second balance beam rotatably secured to the other vehicle by means of its ends and to which the rod is pivotally mounted intermediate its ends; a universal joint device connecting said link and rod together; and means for turning said rod around its pivotal connection to aid the vehicles in negotiating curves.

2. A coupling device for vehicles comprising a U-shaped link for one of the vehicles; a rod for the other vehicle; a balance beam rotatably secured to one of the vehicles by means of its ends and to which the link is pivotally mounted intermediate its ends; a second balance beam rotatably secured to the other vehicle by means of its ends and to which the rod is pivotally mounted intermediate its ends; a shaft resiliently connected to the link; a universal joint device connecting said link and rod together; and means for turning said rod around its pivotal connection to aid the vehicles in negotiating curves.

3. A coupling device for vehicles comprising a U-shaped link for one of the vehicles; a rod for the other vehicle; a balance beam rotatably secured to one of the vehicles by means of its ends and to which the link is pivotally mounted intermediate its ends; a second balance beam rotatably secured to the other vehicle by means of its ends and to which the rod is pivotally mounted intermediate its ends; a shaft resiliently connected to the link; a universal joint device connecting said link and rod together; and a cable attached to said rod to turn the rod around its pivotal connection to aid the vehicles in negotiating curves.

In testimony whereof I affix my signature.

JESÚS de VEGA.